United States Patent [19]

Pepper et al.

[11] Patent Number: 4,833,314
[45] Date of Patent: May 23, 1989

[54] VARIABLE PHASE STOP FOR USE IN INTERFEROMETERS

[75] Inventors: David M. Pepper; Thomas R. O'Meara, both of Malibu, Calif.

[73] Assignee: Hughes Aircraft Company, Los Angeles, Calif.

[21] Appl. No.: 236,343

[22] Filed: Aug. 22, 1988

Related U.S. Application Data

[63] Continuation of Ser. No. 14,413, Feb. 13, 1987, abandoned.

[51] Int. Cl.$^4$ ................................................. G01J 1/20
[52] U.S. Cl. .................................... 250/201; 250/550; 350/509
[58] Field of Search ................ 250/201, 550; 356/353, 356/354, 355, 356, 357; 350/509, 510, 336

[56] References Cited

U.S. PATENT DOCUMENTS

| | | | |
|---|---|---|---|
| 2,766,655 | 10/1956 | Pinkowski | 350/509 |
| 3,402,001 | 9/1968 | Fleisher | 350/150 |
| 3,634,695 | 1/1972 | Barringer | 250/550 |
| 3,646,608 | 2/1972 | Rowland | 350/509 |
| 4,309,602 | 1/1982 | Gonsalves et al. | 250/201 |
| 4,313,663 | 2/1982 | Stemme et al. | 350/336 |
| 4,333,720 | 6/1982 | Suzuki et al. | 350/336 |
| 4,370,024 | 1/1983 | Task et al. | 250/550 |

FOREIGN PATENT DOCUMENTS

56-114923 9/1981 Japan.
58-184115 10/1983 Japan.
59-105613 6/1984 Japan.

OTHER PUBLICATIONS

IBM Technical Disclosure Bulletin, vol. 27, No. 10B, Mar. 1985, "Thin Film Camera Iris Using Liquid Crystalline Material", pp.6166–6167.
O. Y. Kown, "Multichannel Phase-Shifted Interferometer", Optics Letters, vol. 9, No. 2, Feb. 1984, pp. 59–61.

Primary Examiner—David C. Nelms
Attorney, Agent, or Firm—V. D. Duraiswamy; A. W. Karambelas

[57] ABSTRACT

An electro-optical device (10) is used to alter characteristics of a light beam passing through it. In a particularly preferred embodiment, the device (10) is used as a phase stop having a dynamically variable aperture whose size is defined by the selected application of an electrical potential across one or more concentric, transparent ring-like electrodes (13, 14, 16 and 18). The electro-optical device (10) finds particular utility in a common-path interferometer (40) where fringe visibility is optimized by using suitable servo-electronics (56) to select an appropriate aperture size for the phase stop (10).

15 Claims, 3 Drawing Sheets

VARIABLE PHASE STOP FOR USE IN INTERFEROMETERS

This application is a continuation of application Ser. No. 014,413, filed Feb. 13, 1987, now abandoned.

TECHNICAL FIELD

This invention relates to interferometers and, more particularly, to phase stops for altering the phase of light passing therethrough.

BACKGROUND

Phase stops are used in interferometers to modify the phase of a portion of a light beam passing therethrough. These phase stops are often used in common-path interferometers such as the Zernike phase contrast microscope. Among the advantages of common-path interferometers over separate-path interferometers is that the former tend to be more rugged and less susceptible to environmental perturbations due to mechanical, thermal and other similar forces as well as being less susceptible to aberrations caused by the additional optical components required by the separate-path interferometers. The use of a variable diameter dynamic amplitude pin hole design for use in separate-path interferometers has been suggested for the purpose of increasing fringe visibility. Although this arrangement is useful, it is relatively inefficient since the light of interest is diminished due to photon loss in the beam splitters in the system and the amplitude-stop nature of the pin hole design.

The known common-path interferometers also have their drawbacks. Since they generally use fixed-diameter phase stops, the known systems can only be optimized for a limited range of low to high spatial frequency content in the wavefront. Accordingly, fringe visibility will not be very good if it is desired to use the interferometer to analyze a different class of phase objects than the phase object for which the fixed phase stop was selected, or phase objects that vary in time.

SUMMARY OF THE INVENTION

In view of the foregoing, there is a need for a dynamically variable phase stop whose characteristics can be electrically controlled. In such manner, the phase stop can be used in common-path interferometers to provide an adaptive system that can optimize fringe visibility for a wide class of objects of interest.

According to the present invention, a phase stop is provided by way of an electro-optical device through which a light beam of interest is directed. Means are provided on the electro-optical material to shift the phase of a portion of light with respect to the remainder of the beam passing through the device. In the preferred embodiment, a plurality of concentric transparent electrodes on one face of the device are used to define the aperture size of the phase stop. The present invention finds particular utility in a common-path interferometer having a feed back loop designed to selectively energize a given electrode or a set of electrodes to optimize the fringe visibility of the object being analyzed.

BRIEF DESCRIPTION OF THE DRAWINGS

The various advantages of the present invention will become apparent to one skilled in the art upon reading the following specification and by reference to the drawings in which.

DESCRIPTION OF THE PREFERRED EMBODIMENTS

Figure 1:
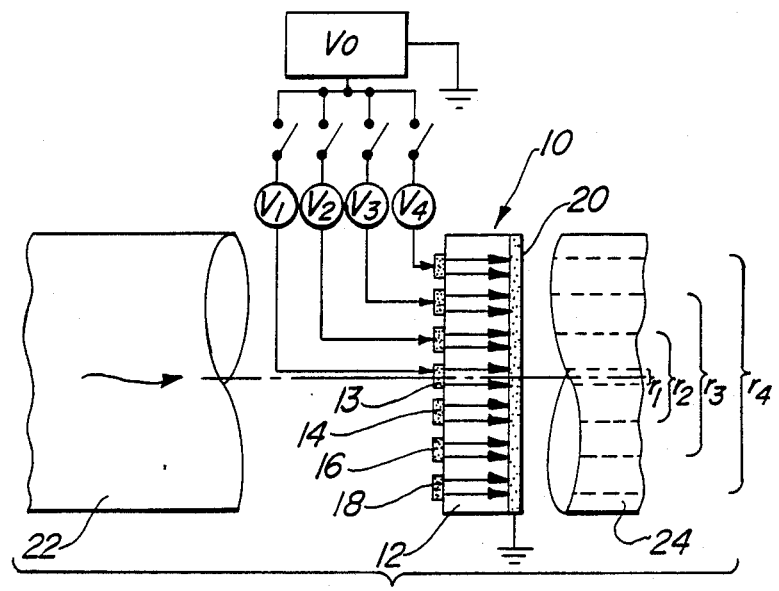
FIG. 1 is a side view of an electro-optical device made in accordance with one embodiment of this invention.

With reference to FIGS. 1–5, the phase stop 10 is constructed of suitable electro-optical or other controllable optical material whose optical path difference or phase shift characteristics vary depending upon the nature of an applied electrical field or other controlling forces. Generally, the electro-optical material should possess good birefringent characteristics and be transparent. Suitable electro-optical mediums include lithium niobium trioxide, liquid crystal and the like, with liquid crystal being presently preferred. As a result, the present invention will be described without limitation in connection with the phase stop 10 taking the form of a liquid crystal film or cell 12. The front surface of cell 12 includes a plurality of concentric transparent ring electrodes 13, 14, 16 and 18. The rear surface of liquid crystal cell 12 has a generally continuous transparent electrode 20 covering it. Means are provided for selectively applying electrical voltage to each of the ring electrodes. In FIG. 1, this is simplistically represented by the lines labeled $V_1$, $V_2$, $V_3$ and $V_4$ which can be selectively connected to a potential source $V_0$ through a series of switches. The rear electrode 20 is connected to ground.

Figure 4:
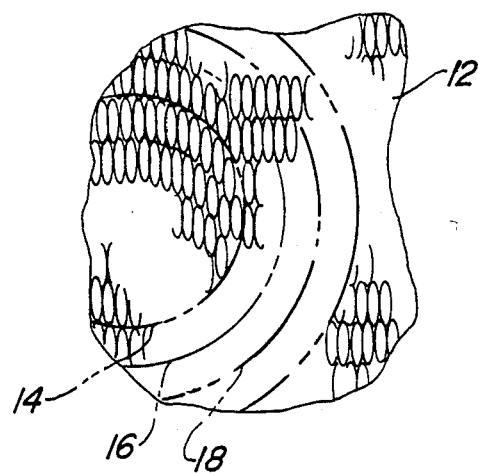
FIG. 4 is a schematic view illustrating the orientation of liquid crystals in the device of FIG. 1 with a uniform electric field applied.
Figure 5:
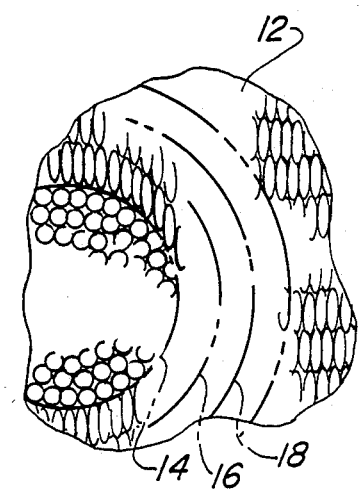
FIG. 5 is a view similar to FIG. 4 with an electric field applied to some of the innermost electrodes.

FIG. 4 schematically represents the orientation of the liquid crystals within cell 12 when no electric field is applied across the two major faces thereof. Essentially all of the liquid crystal molecules are aligned in one direction. As a result, an incoming light beam (represented in FIG. 1 by the numeral 22) is modified uniformly as it passes through the phase stop 10 so that the exit beam 24 also has generally uniform characteristics throughout its cross section. However, when an electric field is applied to one or more of the electrodes 13, 14, 16 or 18, the orientation of the liquid crystals change thereby creating a shift in the phase of the light passing through these "reoriented" crystals. In FIG. 5, the liquid crystals are shown reoriented essentially 90 degrees from their original orientation due to an influence of an electric field applied to electrodes 13 and 14. In FIGS. 4 and 5 the influence of an electric field if applied to the other electrodes are shown in dotted lines. The physical characteristics of the liquid crystal cell (liquid crystal cell type thickness, etc.) are preferably chosen so that a phase shift of approximately 90 degrees in the light passing through the reoriented crystals results. The amount of voltage $V_1$, $V_2$, $V_3$ and $V_4$ is also chosen to create a sufficiently strong electric field so as to "saturate" the liquid crystal molecules so as to reorient them to the same position each time an electric field is applied. In such manner, an optimal 90 degree phase shift with respect to the outer portion of the beam that does not pass through the reoriented crystals will result.

With additional reference to FIG. 3 it can be seen that the aperture or "iris" of the phase stop 12 is determined by which electrode(s) are energized. For example, if electrode 13 is energized then the smaller inner core $r_1$ will be phase shifted as illustrated in FIG. 3(A). On the other hand, if the electrode 16 with the larger diameter is energized then the larger core $r_3$ of the exit beam 24 will be phase shifted 90 degrees with respect to the outer portion of the beam that passes through the nonaffected outer portions of the transparent liquid crystal cell 12.

Figure 2:
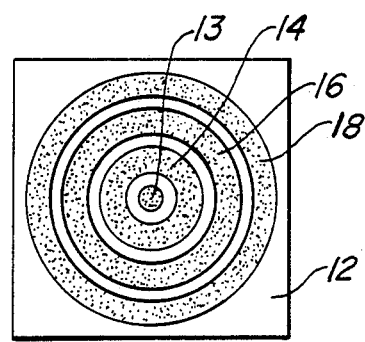
FIG. 2 is a front view of the embodiment of FIG. 1.
Figure 3A:
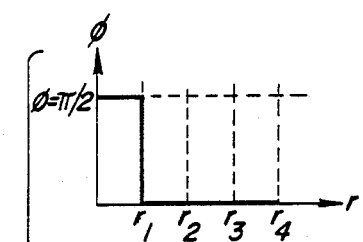
FIGS. 3A, and 3B are graphs illustrating the relationship between voltage applied to the electrodes and the radius of the aperture in the device.
Figure 3A:
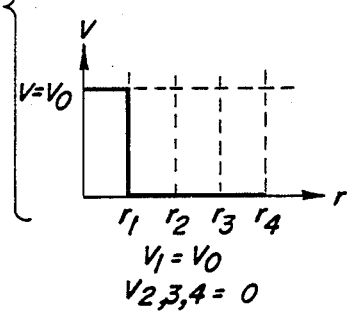
Figure 3B:
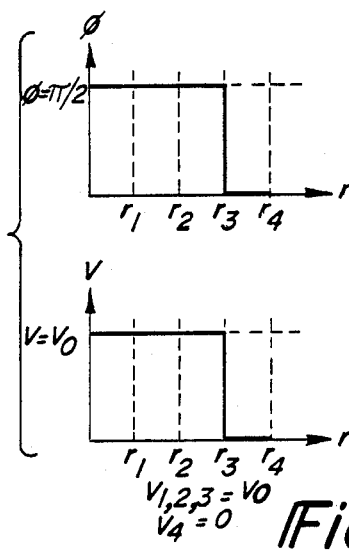
Figure 3B:
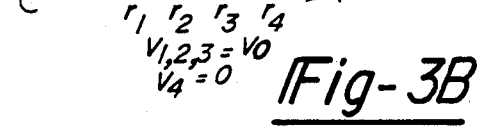
Figure 6:
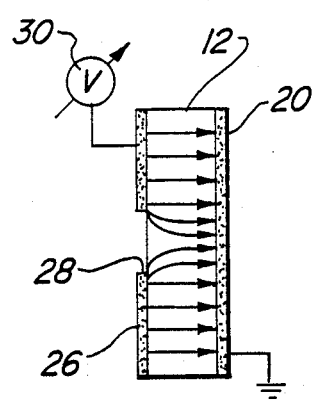
FIG. 6 is a side view of a second embodiment of a device made in accordance with this invention.
Figure 7:
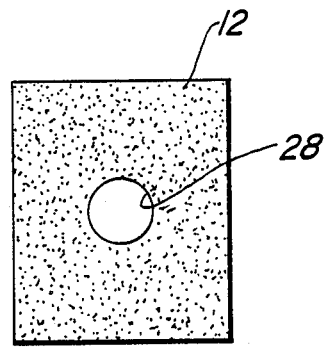
FIG. 7 is a front view of the device shown in FIG. 6.
Figure 8:
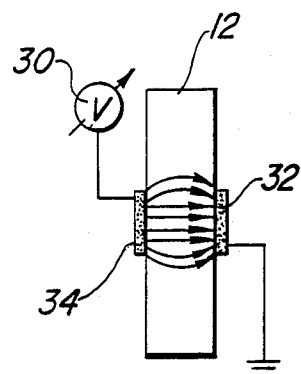
FIG. 8 is a side view of a third embodiment.
Figure 9:
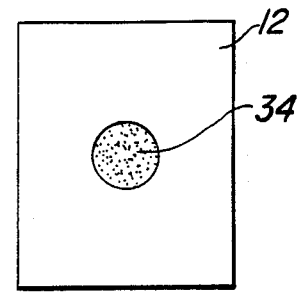
FIG. 9 is a front view of the FIG. 8 embodiment.

While the embodiment shown in FIGS. 1-2 is presently preferred because of its capability of providing a simply implemented stepwise radial phase variation, other constructions can be used that fall within the broad concept of the present invention. For example, the embodiments shown in FIGS. 6-9 reflect a second basic approach to radial spatial control but these designs only require a single applied control voltage. Common reference numerals are used to represent common elements previously discussed in connection with the earlier embodiment. In the embodiment shown in FIGS. 6-7, the front electrode 26 has a circular hole 28 formed therein such as by the use of suitable photolithographic etching techniques. In the embodiment shown in FIGS. 8-9 there is provided basically a "reverse contrast" electrode pattern employing two smaller concentrically aligned disc shaped electrodes 32 and 34. In both embodiments, a single applied voltage 30 across the cell 12 yields a smoothly varying, radially-dependent electric field distribution (represented by the arrows in the drawings). The electric field is axially symmetrical about the cell but has local minimum or maximum field strength in certain areas along the axis depending upon the electrode geometry. The FIG. 6-7 embodiment provides a radially increasing fringe-field configuration whereas the FIG. 8-9 embodiment provides a radially decreasing fringe-field configuration. In either embodiment, these constructions result in a radially varying liquid crystal tilt distribution and therefore a concomitant radial phase distribution.

In the limit of large voltages, the liquid crystal molecules will be rotated through 90 degrees in the central region, with parameters set so that the maximum phase shift of the light beam is $\pi/2$. Hence, the effective "radius" of the phase stop is determined by the fringe field regions, where the optical induced phase shift dropped from $\pi/2$ to 0 degrees. Hence, a phase step of $\pi/2$ with a radially varying taper results.

Figure 10:
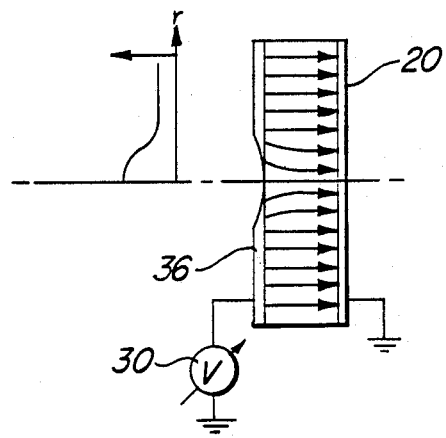
FIG. 10 is a side view of a fourth embodiment.

FIG. 10 illustrates still another embodiment where the electro-optical cell is provided with a continuous rear electrode of substantially uniform thickness while the resistance of the forward electrode 36 varies radially. This is illustrated in an exaggerated manner in the drawing. The "tapered" resistance can be provided, for example, by known vapor deposition techniques. The variable resistance of electrode 36, in turn, varies the electric field applied throughout the electro-optical member 30. Accordingly, the phase shift of the exit beam 32 is likewise affected in a radially varying manner. This approach enables one to have good control over the "radius" and magnitude of the phase stop. Still other approaches can be used such as a hybrid scheme employing both the concentric electrode design of the FIG. 1-4 embodiment together with the fringing-field concept described in connection with the other embodiments.

Figure 11:
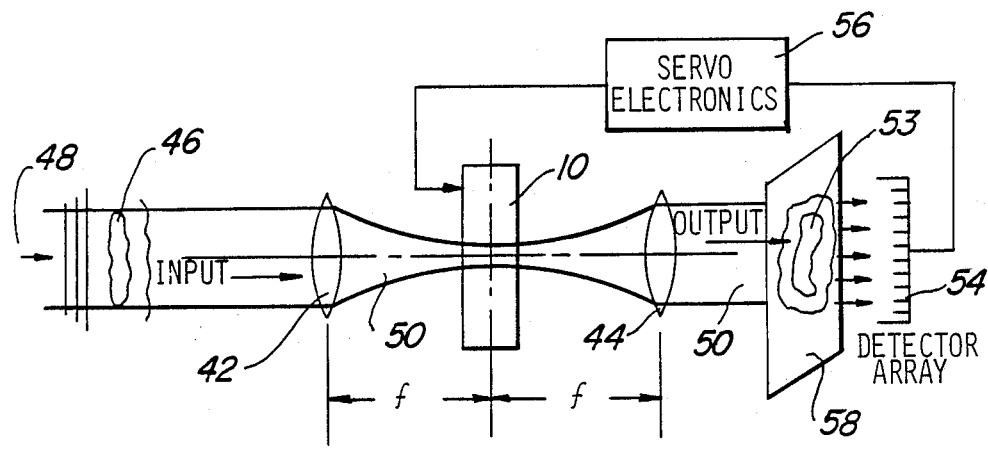
FIG. 11 is a schematic view illustrating an interferometer in which the electro-optical device of the present invention find particular utility.

FIG. 11 illustrates a common path interferometer 40 in which the phase stop devices of the present invention find particular utility. The particular interferometer 40 shown in FIG. 11 is a Zernike phase-contrast microscope that has been modified to take advantage of the dynamically variable capabilities of the electro-optical device of the present invention. In this particular embodiment, the phase stop device 10 of the FIG. 1 embodiment is placed at the common focal plane of a two-lens system employing lenses 42 and 44. The object 46 to be analyzed is illuminated advantageously by whitelight (i.e., broad band) represented by a source labeled 48. Device 10 is used to shift the phase of a portion of the input beam 50 so that the output beam 52 as collimated by lens 44 generates an interference pattern 53 or white-light fringes of the object 46 at an output plane. A detector array 54 cooperates with suitable servo-electronics 56 to optimize the fringe visibility of the interference pattern generated at the output plane 58. The fringe visibility is optimized by adjusting the radius of the aperture of "iris" of the electro-optical device 10 by applying voltage to one or more of the concentric electrodes. Hence, for small DC (spatial frequency) amplitudes of the incoming light, the radius of the device 10 can be increased by generating the appropriate voltage levels on more than one of the concentric electrodes to thereby increase the amount of light that is phase shifted by the reoriented liquid crystals. As known in the art, the fringe visibility is optimized by matching the amount of phase-shifted light with the nonphase-shifted light.

Through the use of suitable servo techniques, the phase stop radius of device 10 can be updated to accommodate time-varying phase objects. In this fashion, an effective "fringe contrast" automatic gain control is realized with respect to a given interference pattern. Since the AC and DC spatial components essentially propagate along a common path, the interferometer 40 is essentially self-referencing and can resolve whitelight illuminated objects. Moreover, the interferometer is more rugged than and, hence, less susceptible to problems associated with "separate-path" interferometers.

It should be understood that while this invention has been described in connection with particular examples thereof, no limitation is intended since those skilled in the art will realize that various modifications of the specific embodiments can be made after a study of the specification, drawings and following claims.

What is claimed is:

1. A common-path interferometer comprising:
an input beam for illuminating an object to be analyzed;
a first lens for focusing the input beam to a given plane;
a substantially transparent electro-optical variable phase stop device having a cell body at said given plane, said electro-optical device having a first electrode on one surface of the cell, with an opposite surface of the cell having at least one second electrode mounted thereon, said cell being made of electro-optical material for transmitting substantially all of the light from the beam while selectively creating a maximum phase shift of about 90 degrees to portions of the beam passing through it;

a second lens for collimating light passing through the electro-optical device;

a detector array at said output plane for detecting interference patterns therein and providing an output associated with fringe visibility of the interference pattern; and servo means connected between the detector array and the electro-optical device, said servo means being adapted to apply an electric voltage to the electrodes to optimize fringe visibility by dynamically altering the amount of light which is phase shifted with respect to that portion of the light in the input beam passing through the electro-optical device which is not shifted in phase.

2. The interferometer of claim 1 wherein the input beam is white light.

3. The interferometer of claim 1 wherein the electro-optical cell is made of liquid crystal material.

4. The interferometer of claim 1 wherein said first and second electrodes each comprise single electrical contacts to the cell; and wherein a variable voltage source is connected between the electrodes to generate fringing electrical fields in the electro-optical material.

5. The interferometer of claim 4 wherein said first and second electrodes comprise disc-shaped electrodes concentrically located in the middle of the surfaces of the cell.

6. The interferometer of claim 4 wherein said second electrode has an electrical resistance which varies radially outwardly from the middle of said opposite surface of the cell to thereby affect electric field distribution throughout the electro-optical material.

7. The interferometer of claim 4 wherein said first electrode substantially covers said one surface of the cell; and wherein said second electrode covers the opposite surface except for an opening centrally located therein; and wherein said servo means applies a variable voltage source between the first and second electrodes.

8. The interferometer of claim 1 wherein said first electrode comprises a generally continuous electrode covering said one surface; and wherein said at least one second electrode comprises a plurality of concentric ring electrodes on said opposite surface.

9. The interferometer of claim 8 wherein a plurality of fixed voltage sources are connected to each ring electrode; and wherein said servo means applies said voltage sources to selected ring electrodes as a function of the output of the detector array to thereby alter the size of the diameter of the beam that is phase shifted with respect to outer portions of the beam passing through the cell.

10. A method of analyzing objects of different spatial frequency content, said method comprising:

illuminating the object with a beam of white light;

passing the beam through a substantially transparent variable phase stop device, said device having a cell body made of electro-optical material for transmitting substantially all of the light from the beam while selectively creating a maximum phase shift of about 90 degrees to portions of the beam passing through it;

applying first and second electrodes to opposite surfaces of the cell;

illuminating a detector array with the beam passing through the phase stop device;

optimizing the fringe visibility of an interference pattern at the detector array by applying an electrical voltage to the electrodes to cause the electro-optical material in a selected portion of the cell to change characteristics and shift the phase of the light beam striking the changed material substantially 90 degrees with respect to the remaining portion of the beam passing through the device.

11. The method of claim 10 which further comprises:

generating an output signal associated with fringe visibility of the interference pattern at the detector array; and using said output signal to generate a feedback signal for dynamically altering the applied electrical voltage so as to optimize fringe visibility at the detector array.

12. A variable phase stop device for shifting a portion of a light beam substantially 90 degrees with respect to remaining portions of the beam passing through the device, said device comprising:

an electro-optical cell having two major surfaces;

a first electrode on one surface;

a second electrode on an opposite surface;

said cell being made of electro-optical material for transmitting substantially all of the light from the beam passing therethrough while selectively creating a maximum phase shift of about 90 degrees with respect to portions of the remaining beam passing through it; and a variable voltage source connected between the first and second electrodes for creating fringing electrical fields therebetween for altering characteristics of the electro-optical material to cause the phase shift of light passing through it.

13. The device of claim 12 wherein said first electrode substantially covers one surface of the electro-optical cell; and wherein the second electrode substantially covers the opposite surface except for an opening centrally located therein.

14. The device of claim 12 wherein said first and second electrodes each comprise disc-shaped electrodes concentrically located in the middle of the major surfaces of the cell.

15. The device of claim 12 wherein said first electrode has an electrical resistance which radially varies outwardly from the middle of one surface of the cell.

* * * * *